United States Patent
Kuo

(10) Patent No.: US 10,422,940 B2
(45) Date of Patent: Sep. 24, 2019

(54) DISPLAY PANEL

(71) Applicant: Acer Incorporated, New Taipei (TW)

(72) Inventor: Jin-Ting Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 149 days.

(21) Appl. No.: 15/652,263

(22) Filed: Jul. 18, 2017

(65) Prior Publication Data

US 2018/0149798 A1   May 31, 2018

(30) Foreign Application Priority Data

Nov. 25, 2016 (TW) .............................. 105138790 A

(51) Int. Cl.
| | |
|---|---|
| *G02F 1/133* | (2006.01) |
| *F21V 8/00* | (2006.01) |
| *G02F 1/1334* | (2006.01) |
| *G02F 1/13357* | (2006.01) |
| *G02F 1/1335* | (2006.01) |

(52) U.S. Cl.
CPC ......... *G02B 6/0055* (2013.01); *G02B 6/0036* (2013.01); *G02B 6/0051* (2013.01); *G02F 1/1334* (2013.01); *G02F 1/1336* (2013.01); *G02F 2001/133618* (2013.01)

(58) Field of Classification Search
CPC .................................................. G02F 1/133606
See application file for complete search history.

(56) References Cited

U.S. PATENT DOCUMENTS

| | | | |
|---|---|---|---|
| 2002/0080466 A1* | 6/2002 | Bayart | G02F 1/1334 359/295 |
| 2003/0169387 A1 | 9/2003 | Liang et al. | |
| 2005/0185115 A1 | 8/2005 | Yee et al. | |
| 2012/0274867 A1* | 11/2012 | Shinkai | G02F 1/133606 349/15 |
| 2014/0240642 A1* | 8/2014 | Furukawa | H05B 33/0857 349/65 |
| 2014/0300528 A1* | 10/2014 | Ebisui | G02B 27/2214 345/32 |

FOREIGN PATENT DOCUMENTS

| | | |
|---|---|---|
| CN | 102628579 | 8/2012 |
| CN | 102654687 | 9/2012 |
| CN | 103502882 | 1/2014 |
| CN | 205176436 | 4/2016 |
| TW | 201300843 | 1/2013 |
| TW | I437325 | 5/2014 |
| TW | M520650 | 4/2016 |

\* cited by examiner

*Primary Examiner* — James A Dudek
(74) *Attorney, Agent, or Firm* — JCIPRNET

(57) ABSTRACT

A display panel is provided. The display panel includes a display layer, a light diffusion layer, and a light guide plate. The display layer is used to display an image. The light guide plate is disposed under the display layer. The light guide plate guides a light of a back light source to the display layer. The light diffusion layer is disposed between the display layer and the light guide plate. The light diffusion layer is controlled by at least one control voltage, so as to dynamically change the transparency of the light diffusion layer.

14 Claims, 7 Drawing Sheets

DISPLAY PANEL

CROSS-REFERENCE TO RELATED APPLICATION

This application claims the priority benefit of Taiwan application serial no. 105138790, filed on Nov. 25, 2016. The entirety of the above-mentioned patent application is hereby incorporated by reference herein and made a part of this specification.

BACKGROUND OF THE INVENTION

Field of the Invention

The invention relates to an electronic device and more particularly relates to a display panel.

Description of Related Art

With the progress of technology, two-dimensional images displayed by the traditional display screen can no longer satisfy people's needs. The traditional display screen with a back light would block the user's view and therefore the user cannot see behind the display screen. A liquid crystal display screen that does not use back light may allow the user to see the object behind the display screen through the display screen. Nevertheless, the images displayed by such a see-through display screen usually have poor brightness.

SUMMARY OF THE INVENTION

The invention provides a display panel which provides a back light to enhance the brightness of an image and dynamically decides whether to provide a see-through function.

According to an embodiment of the invention, a display panel is provided, which includes a display layer, a light guide plate, and a light diffusion layer. The display layer is used to display an image. The light guide plate is disposed under the display layer and guides a light of a back light source to the display layer. The light diffusion layer is disposed between the display layer and the light guide plate. The light diffusion layer is controlled by at least one control voltage, so as to dynamically change a transparency of the light diffusion layer according to the at least one control voltage.

Based on the above, the display panel disclosed in the embodiments of the invention includes the transparent light guide plate and the light diffusion layer that dynamically changes the transparency. The light guide plate guides the light of the back light source to pass through the light diffusion layer and enter the display layer in a scattered or transmissive manner, so as to enhance the brightness of the image of the display layer. When the light diffusion layer presents the transparent state, the user is able to see the object behind the display panel through the display panel as well as see the image displayed by the display layer. Thus, the display panel according to the embodiments of the invention enhances the brightness of the image with back light and dynamically decides whether to provide the see-through function.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1A:
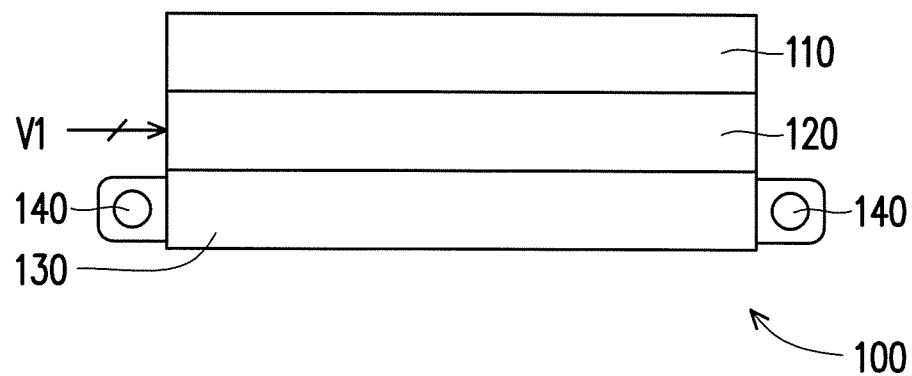
FIG. 1A is a schematic cross-sectional view of the display panel according to an embodiment of the invention.

The term "couple (or connect)" used throughout this specification (including the claims) may refer to any direct or indirect connection means. For example, if it is described that the first device is coupled (or connected) to the second device, it should be understood that the first device may be directly connected to the second device or indirectly connected to the second device through other devices or certain connection means. Moreover, elements/components/steps with the same reference numerals represent the same or similar parts in the figures and embodiments where appropriate. Descriptions of the elements/components/steps with the same reference numerals or terms in different embodiments may be reference for one another.

FIG. 1A is a schematic cross-sectional view of a display panel 100 according to an embodiment of the invention. According to the design requirements, the display panel 100 may be applied to a laptop computer, a tablet computer, a handheld electronic device, a display, an automatic vending machine, or other electronic devices. The display panel 100 is capable of dynamically determining whether to provide a see-through function. When the display panel 100 provides the see-through function, the user is able to see an object behind the display panel 100 through the display panel 100 as well as see an image displayed by a display layer 110. When the display panel 100 does not provide the see-through function, the user only sees the image displayed by the display panel 100 and is not able to see the object behind the display panel 100 through the display panel 100.

The display panel 100 includes a display layer 110, a light diffusion layer 120, a light guide plate 130, and a back light source 140. The back light source 140 may be a cold cathode fluorescent lamp (CCFL) light source, a light emitting diode (LED) light source, or other back light sources. The back light source 140 is disposed on a lateral side of the light guide plate 130. The back light source 140 may emit a light into the light guide plate 130. The light guide plate 130 is disposed under the display layer 110. A material of the light guide plate 130 is a transparent material. The light guide plate 130 has a light guide structure, such that the light guide plate 130 is able to guide the light of the back light source 140 to the light diffusion layer 120 and the display layer 110. The display layer 110 is for displaying an image. According to the design requirements, the display layer 110 may include a liquid crystal display panel or other types of display panels. The liquid crystal display panel may be a twisted nematic (TN) display panel, a super-twisted nematic (STN) display panel, a vertical alignment (VA) display panel, an in-plane switching (IPS) display panel, a thin film transistor (TFT) display panel, or other conventional liquid crystal display panels. Thus, details thereof will be omitted hereinafter. According to the design requirements, the display layer 110 may simply provide a display function, or may provide both the display function and a touch detection function.

The light diffusion layer 120 is disposed between the display layer 110 and the light guide plate 130. The light diffusion layer 120 is controlled by a control voltage V1, so as to dynamically change the transparency of the light diffusion layer 120. As an example (but not limited thereto), when the control voltage V1 exceeds a threshold voltage Vt1, the light diffusion layer 120 presents a transparent state. When the control voltage V1 is lower than the threshold voltage Vt1, the light diffusion layer 120 presents a non-transparent state (e.g., hazy). The threshold voltage Vt1 is determined by a material property of the light diffusion layer 120. When the light diffusion layer 120 is in the transparent state, the light guided by the light guide plate 130 passes through the light diffusion layer 120 and enters the display layer 110, so as to enhance the brightness of the image of the display layer 110. At this moment, the user is able to see the object behind the display panel 100 through the display panel 100 as well as see the image displayed by the display layer 110. When the light diffusion layer 120 is in the non-transparent state, the light of the back light source 140 guided by the light guide plate 130 passes through the light diffusion layer 120 and enters the display layer 110 in a scattered manner, so as to enhance the brightness of the image of the display layer 110. At this moment, the user is able to see only the image displayed by the display layer 110 and cannot see the object behind the display panel 100 through the display panel 100.

Figure 1B:
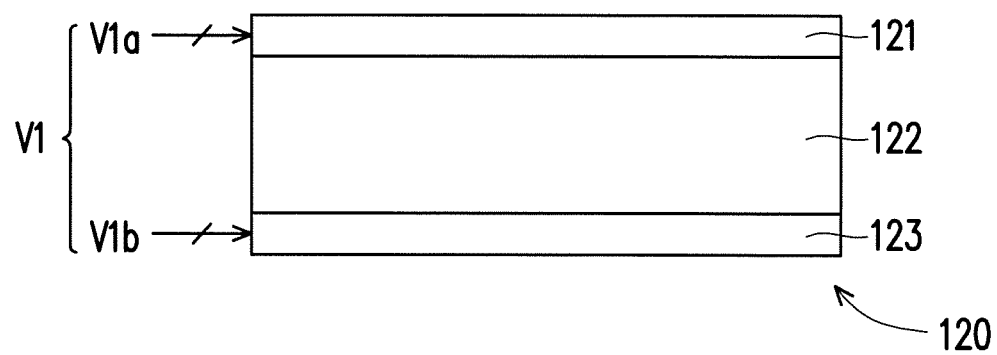
FIG. 1B is a schematic cross-sectional view of the light diffusion layer shown in FIG. 1A according to an embodiment of the invention.

FIG. 1B is a schematic cross-sectional view of the light diffusion layer 120 shown in FIG. 1A according to an embodiment of the invention. In the embodiment shown in FIG. 1B, the light diffusion layer 120 includes a first electrode 121, a polymer dispersed liquid crystal (PDLC) 122, and a second electrode 123. The polymer dispersed liquid crystal 122 may relatively change/present different transparencies according to different electric field intensities. The polymer dispersed liquid crystal 122 is disposed between the first electrode 121 and the second electrode 123. A material of the first electrode 121 and the second electrode 123 is a transparent conductive material. The first electrode 121 and the second electrode 123 may be connected to a control circuit (not shown). The first electrode 121 and the second electrode 123 of the light diffusion layer 120 may receive a DC voltage or an AC voltage. The control voltage V1 controls the light diffusion layer 120 to present the transparent or non-transparent state.

For example, the control voltage V1 includes a control voltage V1a and a control voltage V1b, wherein the control voltage V1a is transmitted to the first electrode 121 and the control voltage V1b is transmitted to the second electrode 123. When the control voltage V1 exceeds the threshold voltage Vt1, that is, when a potential difference between the control voltage V1a and the control voltage V1b exceeds the threshold voltage Vt1, the polymer dispersed liquid crystal 122 of the light diffusion layer 120 presents the transparent state. Therefore, the light from the light guide plate 130 passes through the light diffusion layer 120 and reaches the display layer 110 in a transmissive manner (which barely affects a traveling direction of the light). When the control voltage V1 is lower than the threshold voltage Vt1, that is, when the potential difference between the control voltage V1a and the control voltage V1b is lower than the threshold voltage Vt1, the polymer dispersed liquid crystal 122 of the light diffusion layer 120 presents the non-transparent state (e.g., hazy). Therefore, the light from the light guide plate 130 passes through the light diffusion layer 120 and reaches the display layer 110 in a scattered manner.

Figure 2A:
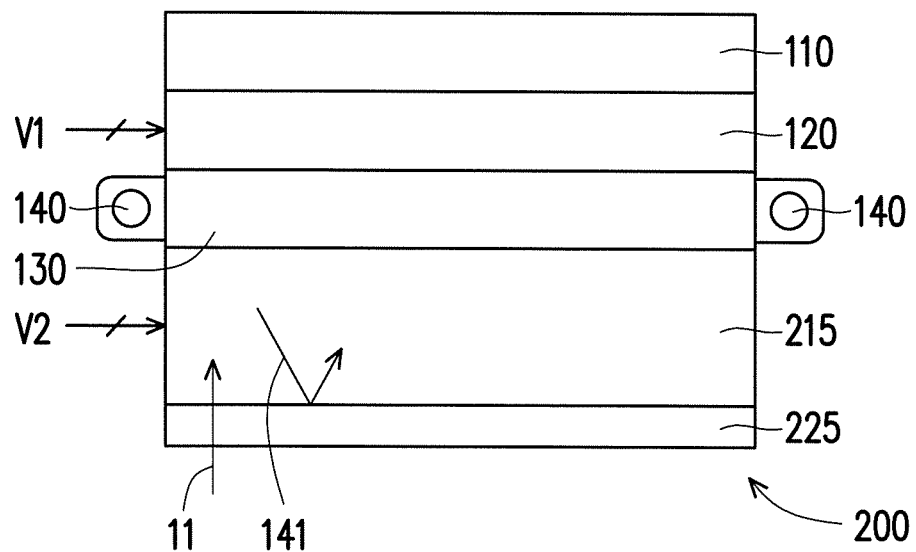
FIG. 2A is a schematic cross-sectional view of the display panel according to another embodiment of the invention.

FIG. 2A is a schematic cross-sectional view of a display panel 200 according to another embodiment of the invention. The display panel 200 includes a display layer 110, a light diffusion layer 120, a light guide plate 130, a back light source 140, a light reflection layer 215, and a one-way mirror layer 225. Details of the display layer 110, the light diffusion layer 120, the light guide plate 130, and the back light source 140 in the embodiment shown in FIG. 2A may be found in the descriptions of FIG. 1A and FIG. 1B, and thus are not repeated hereinafter. The light reflection layer 215 is disposed under the light guide plate 130, and the light guide plate 130 is disposed between the display layer 110 and the light reflection layer 215. The one-way mirror layer 225 is disposed under the light reflection layer 215, and the light reflection layer 215 is disposed between the display layer 110 and the one-way mirror layer 225.

A material of the light reflection layer 215 may be polymer dispersed liquid crystal. The light reflection layer 215 is controlled by at least a second control voltage V2, so as to dynamically change the transparency of the light reflection layer 215. When the control voltage V2 exceeds a threshold voltage Vt2, the light reflection layer 215 presents a transparent state. When the control voltage V2 is lower than the threshold voltage Vt2, the light reflection layer 215 presents a non-transparent state (e.g., hazy). The threshold voltage Vt2 is determined by a material property of the light reflection layer 215.

A thickness of the light reflection layer 215 may be greater than a thickness of the light diffusion layer 120. In this embodiment, the thickness of the light diffusion layer 120 may be 75 μm to 200 μm, and the thickness of the light reflection layer 215 may be 201 μm to 1000 μm. It is known from the result of an experiment that, in the case of applying no voltage, polymer dispersed liquid crystal that is 75 μm in thickness has better "visibility" (the farthest distance at which the user sees the object through the polymer dispersed liquid crystal) than polymer dispersed liquid crystal that is 200 μm in thickness. The thicker polymer dispersed liquid crystal reflects light better in the non-transparent state. Therefore, the polymer dispersed liquid crystal of the light reflection layer 215 may serve as a white (or light color/ bright color) light reflection layer. When the control voltage V2 is lower than the threshold voltage Vt2, the polymer dispersed liquid crystal of the light reflection layer 215 presents the non-transparent state, so as to reflect the light of the light guide plate 130 back to the light guide plate 130. When the light diffusion layer 120 and the light reflection layer 215 both present the transparent state, the user is able to see the object behind the display panel 200 through the display panel 200 as well as see the image displayed by the display layer 110.

The one-way mirror layer 225 allows an external light 11 (not the light of the back light source 140) to reach the light reflection layer 215 through the one-way mirror layer 225, but reflects a light 141 from the light reflection layer 215 back to the light reflection layer 215. When the light diffusion layer 120 and the light reflection layer 215 both present the transparent state, based on the one-way light transmission property of the one-way mirror layer 225, the external light 11 passes through the one-way mirror layer 225, the light reflection layer 215, the light guide plate 130, the light diffusion layer 120, and the display layer 110. Therefore, the user is able to see the object behind the display panel 200 through the display panel 200. The one-way mirror layer 225 reflects the light of the back light source 140 to the display layer 110 and the light guide plate 130 guides the light of the back light source 140 to the display layer 110, so as to improve the brightness of the image of the display layer 110. When the light diffusion layer 120 and the light reflection layer 215 present the non-transparent state, the light reflection layer 215 and the one-way mirror layer 225 reflect the light of the back light source 140 to the light diffusion layer 120 and the display layer 110, so as to improve the brightness of the image of the display layer 110. When the light diffusion layer 120 and the light reflection layer 215 present the transparent or non-transparent state, a back surface of the display panel 200 presents a mirror state. The one-way mirror layer 225 may provide the display panel 200 an anti-peeping function, so as to prevent the image of the display layer 110 from being seen from the back surface of the display panel 200.

In some embodiments, according to the design requirements, the one-way mirror layer 225 shown in FIG. 2A may be omitted.

Figure 2B:
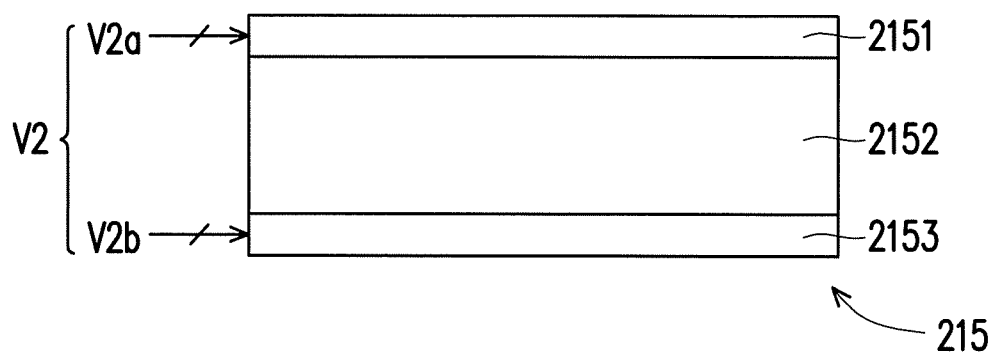
FIG. 2B is a schematic cross-sectional view of the light reflection layer shown in FIG. 2A according to another embodiment of the invention.

FIG. 2B is a schematic cross-sectional view of the light reflection layer 215 shown in FIG. 2A according to another embodiment of the invention. The light reflection layer 215 shown in FIG. 2B includes a first electrode 2151, a polymer dispersed liquid crystal (PDLC) 2152, and a second electrode 2153. The polymer dispersed liquid crystal 2152 may relatively change/present different transparencies according to different electric field intensities. The polymer dispersed liquid crystal 2152 is disposed between the first electrode 2151 and the second electrode 2153. A material of the first electrode 2151 and the second electrode 2153 is a transparent conductive material. The first electrode 2151 and the second electrode 2153 may be connected to a control circuit (not shown). The first electrode 2151 and the second electrode 2153 of the light reflection layer 215 may receive a DC voltage or an AC voltage. The control voltage V2 controls the light reflection layer 215 to present the transparent or non-transparent state.

For example, the control voltage V2 includes a control voltage V2a and a control voltage V2b, wherein the control voltage V2a is transmitted to the first electrode 2151 and the control voltage V2b is transmitted to the second electrode 2153. When the control voltage V2 is lower than the threshold voltage Vt2, that is, when a potential difference between the control voltage V2a and the control voltage V2b is lower than the threshold voltage Vt2, the polymer dispersed liquid crystal 2152 of the light reflection layer 215 presents the non-transparent state (e.g., hazy). When the control voltage V2 is higher than the threshold voltage Vt2, that is, when the potential difference between the control voltage V2a and the control voltage V2b is higher than the threshold voltage Vt2, the polymer dispersed liquid crystal 2152 of the light reflection layer 215 presents the transparent state. The user may put his/her hand behind the display panel 200 to achieve human-machine interaction with a three-dimensional image of the display panel 200.

Figure 3A:
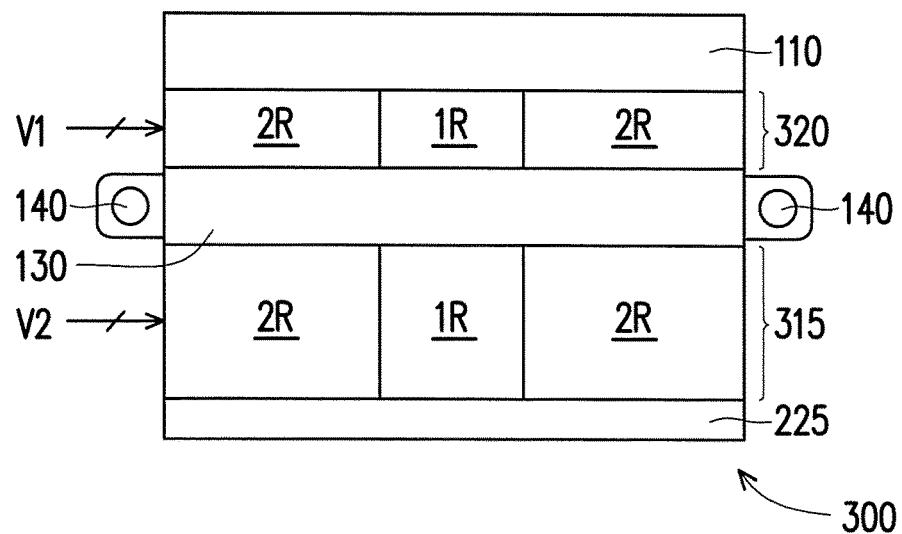
FIG. 3A is a schematic cross-sectional view of the display panel according to yet another embodiment of the invention.

FIG. 3A is a schematic cross-sectional view of a display panel 300 according to yet another embodiment of the invention. The display panel 300 includes a display layer 110, a light guide plate 130, a back light source 140, a one-way mirror layer 225, a light reflection layer 315, and a light diffusion layer 320. Details of the display layer 110, the light guide plate 130, the back light source 140, and the one-way mirror layer 225 shown in FIG. 3A may be found in the descriptions of FIG. 1A and FIG. 2A, and thus are not repeated hereinafter. The light reflection layer 315 and the light diffusion layer 320 shown in FIG. 3A may be derived from the descriptions of the light reflection layer 215 and the light diffusion layer 120 shown in FIG. 1A, FIG. 1B, FIG. 2A, and FIG. 2B.

In the embodiment shown in FIG. 3A, the light diffusion layer 320 includes a first region 1R and a second region 2R, and the light reflection layer 315 includes a first region 1R and a second region 2R. The first region 1R of the light diffusion layer 320 and the first region 1R of the light reflection layer 315 are disposed opposite to each other. For example, in a vertical projection, the first region 1R of the light diffusion layer 320 and the first region 1R of the light reflection layer 315 are located at the same position. The second region 2R of the light diffusion layer 320 and the second region 2R of the light reflection layer 315 are disposed opposite to each other. For example, in the vertical projection, the second region 2R of the light diffusion layer 320 and the second region 2R of the light reflection layer 315 are located at the same position. Moreover, a change of a transparency of the first region 1R of the light reflection layer 315 may be independent of a change of a transparency of the second region 2R of the light reflection layer 315. A change of a transparency of the first region 1R of the light diffusion layer 320 may be independent of a change of a transparency of the second region 2R of the light diffusion layer 320. An example is described hereinafter.

In an embodiment, under control of the control voltage V1 and the control voltage V2, the first region 1R of the light diffusion layer 320 and the first region 1R of the light reflection layer 315 both present the non-transparent state, and the second region 2R of the light diffusion layer 320 and the second region 2R of the light reflection layer 315 both present the transparent state. In this embodiment, the light reflection layer 315 and the light diffusion layer 320 are divided into a plurality of regions that are independently operable to be applied to a human-machine interaction mode.

Figure 3B:
FIG. 3B is a schematic view of the image displayed by the display panel of FIG. 3A.

FIG. 3B is a schematic view of an image displayed by the display panel 300 of FIG. 3A. In this embodiment, the second region 2R has a larger area than the first region 1R. Under control of the control voltage V1 and the control voltage V2, the first region 1R of the light diffusion layer 320 and the first region 1R of the light reflection layer 315 both present the non-transparent state, and the second region 2R of the light diffusion layer 320 and the second region 2R of the light reflection layer 315 both present the transparent state. For example, in the image as shown in FIG. 3B, the display layer 110 may display a plurality of three-dimensional toy models in the second region 2R, and the system may provide a human-machine interaction interface behind the display panel 300 for the user to see two hands behind the display panel 300 through the second region 2R and rotate the three-dimensional toy models 360 degrees in the second region 2R, or disassemble or assemble the toy models, so as to simulate the feeling of actually touching the toy models. The display layer 110 may display the prices or current stock of the toy models in the first region 1R to provide the user more product information.

Figure 4:
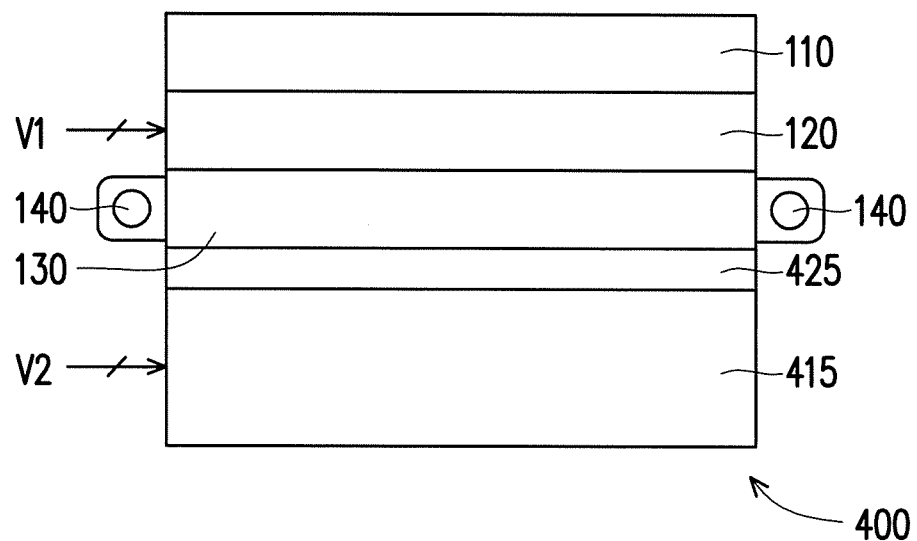
FIG. 4 is a schematic cross-sectional view of the display panel according to yet another embodiment of the invention.

FIG. 4 is a schematic cross-sectional view of a display panel 400 according to yet another embodiment of the invention. The display panel 400 includes a display layer 110, a light diffusion layer 120, a light guide plate 130, a back light source 140, a light reflection layer 415, and a one-way mirror layer 425. Details of the display layer 110, the light diffusion layer 120, the light guide plate 130, and the back light source 140 shown in FIG. 4 may be found in the descriptions of FIG. 1A and FIG. 1B, and thus are not repeated hereinafter. In this embodiment, the one-way mirror layer 425 is disposed under the light guide plate 130. The light guide plate 130 is disposed between the display layer 110 and the one-way mirror layer 425. The one-way mirror layer 425 allows an external light (not the light of the back light source 140) to reach the light guide plate 130 through the one-way mirror layer 425, but the one-way mirror layer 425 reflects the light of/from the light guide plate 120 back to the light guide plate 120. The one-way mirror layer 425 enhances the back light utilization of the display panel 400.

The light reflection layer 415 is disposed under the one-way mirror layer 425, such that the one-way mirror layer 425 is located between the light guide plate 130 and the light reflection layer 415. A material of the light reflection layer 415 includes a polymer dispersed liquid crystal. The light reflection layer 415 is controlled by the second control voltage V2, so as to dynamically change the transparency of the light reflection layer 415. When the control voltage V2 of the light reflection layer 415 is higher than the threshold voltage Vt2, the light reflection layer 415 presents the transparent state. When the control voltage V2 of the light reflection layer 415 is lower than the threshold voltage Vt2, the light reflection layer 415 presents the non-transparent state. Details of the light reflection layer 415 shown in FIG. 4 may be found in the descriptions regarding the light reflection layer 215 shown in FIG. 2A and FIG. 2B, and thus are not repeated hereinafter. When the light diffusion layer 120 and the light reflection layer 415 present the transparent state, the user is able to see the object behind the display panel 400 through the display panel 400 as well as see the image displayed by the display layer 110. In some embodiments, according to the design requirements, the light reflection layer 415 shown in FIG. 4 may be omitted.

Figure 5A:
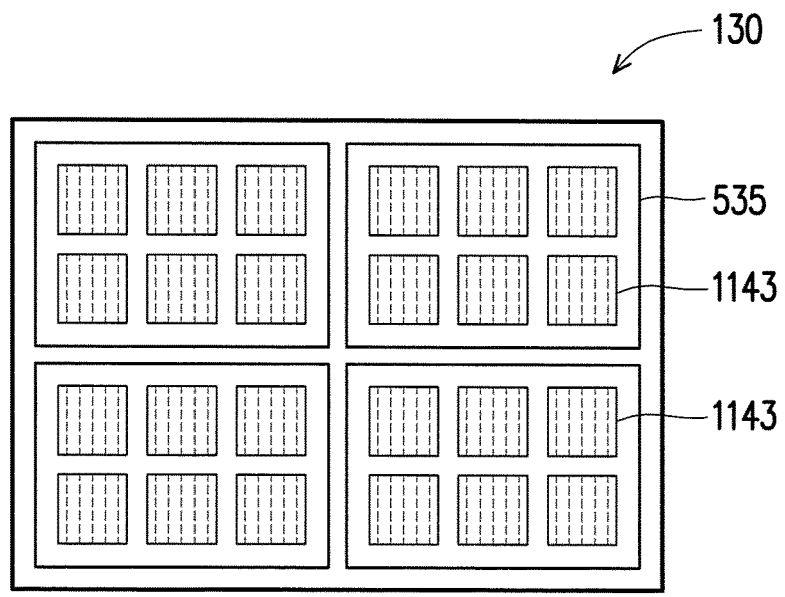
FIG. 5A is a schematic layout diagram of the sub-pixel of the display layer and the light guide microstructure of the light guide plate according to an embodiment of the invention.
Figure 5B:
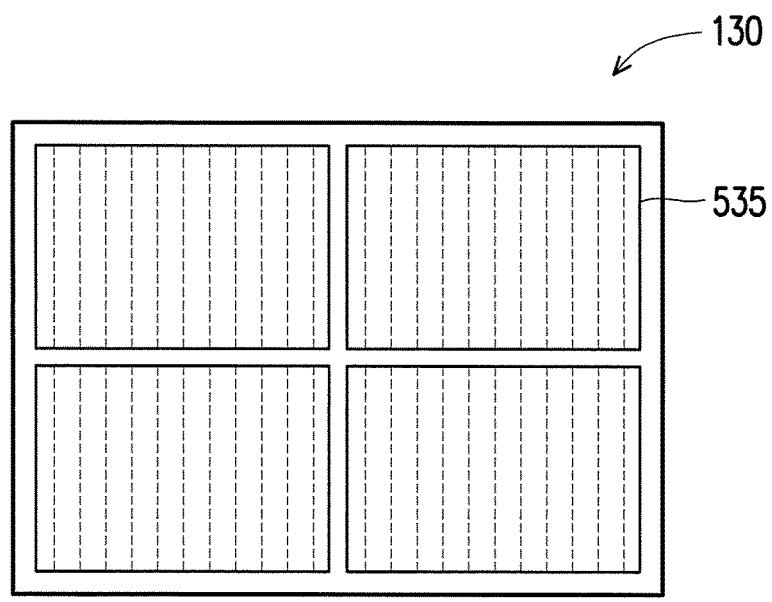
FIG. 5B is a schematic layout diagram of the light guide microstructure of the light guide plate according to an embodiment of the invention.
Figure 5C:
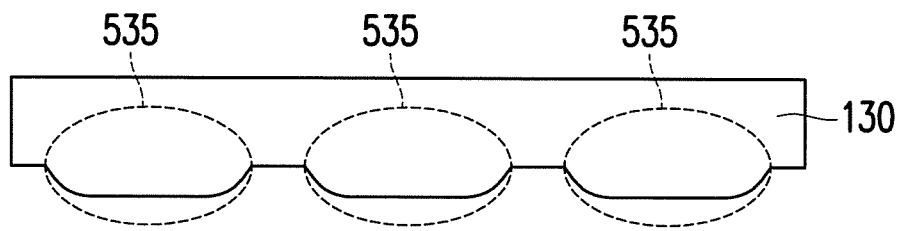
FIG. 5C is a schematic cross-sectional view of the light guide microstructure of the light guide plate according to an embodiment of the invention.
Figure 5D:
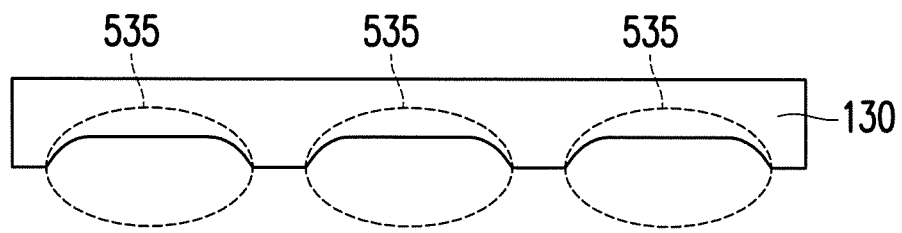
FIG. 5D is a schematic cross-sectional view of the light guide microstructure of the light guide plate according to another embodiment of the invention.

FIG. 5A is a schematic layout diagram of sub-pixels of the display layer 110 and light guide microstructures 535 of the light guide plate 130 according to an embodiment of the invention. FIG. 5B is a schematic layout diagram of the light guide microstructures 535 of the light guide plate 130 according to an embodiment of the invention. FIG. 5C is a schematic cross-sectional view of the light guide microstructures 535 of the light guide plate 130 according to an embodiment of the invention. FIG. 5D is a schematic cross-sectional view of the light guide microstructures 535 of the light guide plate 130 according to another embodiment of the invention. Referring to FIG. 5A, FIG. 5B, FIG. 5C, and/or FIG. 5D, the light guide plate 130 includes a plurality of light guide microstructures 535, wherein the light guide microstructures 535 may be implemented on the light guide plate 130 by printing, carving, laser engraving, or stamping, but this embodiment is not limited thereto. A geometric shape of the light guide microstructure 535 is the same as (or similar to) a geometric shape of a sub-pixel 1143 (or pixel) of the display layer 110. In this embodiment, the geometric shape of the light guide microstructure 535 is rectangular. In the vertical projection, a position of any of the light guide microstructures 535 corresponds to a position of the sub-pixel 1143 (or pixel) of the display layer 110. Moreover, a width of each of the light guide microstructures 535 is an integer multiple of a width of the sub-pixel 1143 (or pixel), and a length of each of the light guide microstructures 535 is an integer multiple of a length of the sub-pixel 1143 (or pixel). Therefore, in the vertical projection, a boundary of the light guide microstructure 535 may not overlap the sub-pixel 1143 (or pixel). Because the boundary of the light guide microstructure 535 does not overlap the sub-pixel 1143 (or pixel), the user does not easily see the light guide microstructures 535.

Figure 6A:
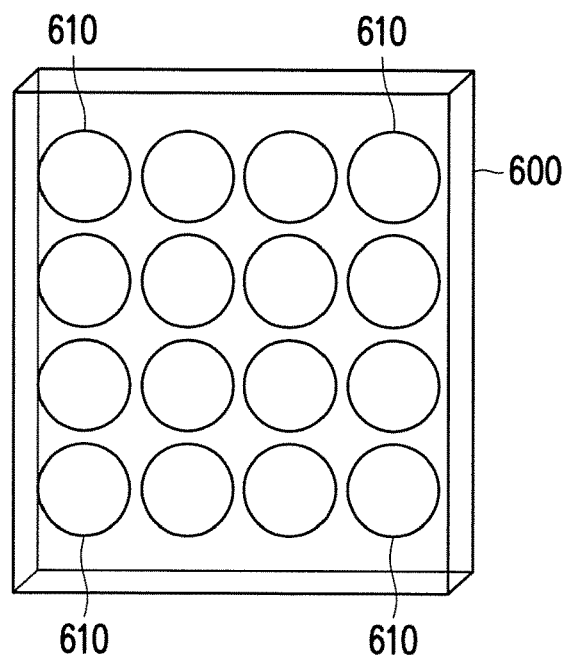
FIG. 6A is a schematic layout diagram of the light guide microstructure of another light guide plate.

In comparison, FIG. 6A is a schematic layout diagram of light guide microstructures 610 of another light guide plate 600. Similar to the light guide plate 130 shown in FIG. 5A, FIG. 5B, FIG. 5C, and/or FIG. 5D, the light guide plate 600 shown in FIG. 6A also includes a plurality of light guide microstructures 610. A difference between the light guide plate 600 and the light guide plate 130 is that a geometric shape of the light guide plate 600 shown in FIG. 6A is different from the geometric shape of the sub-pixel 1143 (or pixel) of the display layer 110.

Figure 6B:
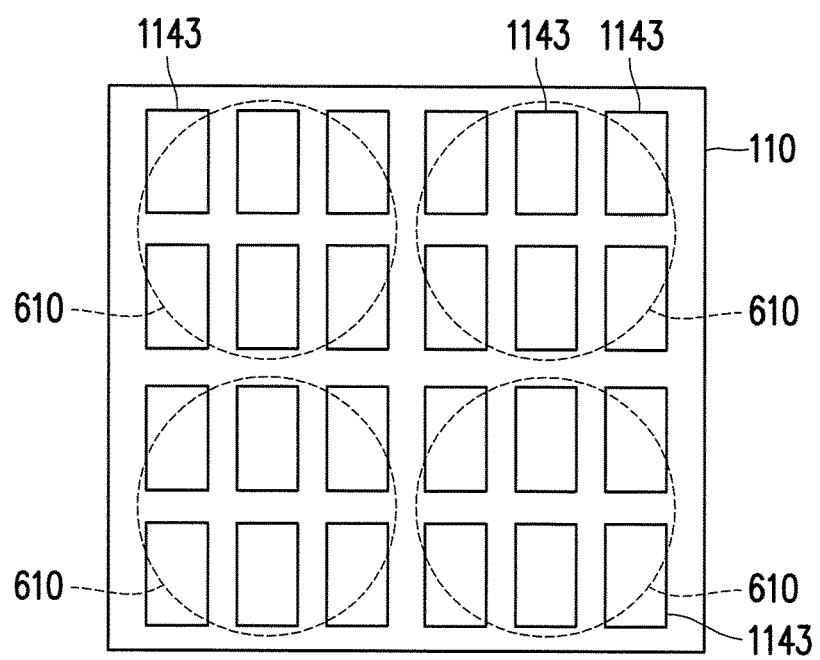
FIG. 6B is a schematic layout diagram of the sub-pixel of the display layer and the light guide microstructure of the light guide plate shown in FIG. 6A according to another embodiment.

FIG. 6B is a schematic layout diagram of the sub-pixels 1143 of the display layer 110 and the light guide microstructures 610 of the light guide plate 600 shown in FIG. 6A according to another embodiment. In the embodiment shown in FIG. 6B, the geometric shape of the sub-pixel 1143 (or pixel) is rectangular while the geometric shape of the light guide microstructure 610 is circular. When the display layer 110 overlaps the light guide plate 600, in the vertical projection, a boundary of the light guide microstructure 610 overlaps the sub-pixel 1143 (or pixel). Because the boundary of the light guide microstructure 610 overlaps the sub-pixel 1143 (or pixel), the user will see the boundary of the light guide microstructures 610.

To conclude, the display panel disclosed in the embodiments of the invention includes the diffusion layer 120. The control voltage V1 may control/adjust the transparency of the diffusion layer 120. In some embodiments, the display panel further includes the diffusion layer 120 and the light reflection layer 215 that have different thicknesses for increasing the back light utilization of the display panel. In some other embodiments, the diffusion layer 320 and the light reflection layer 315 are further divided into different regions that are independently operable.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A display panel, comprising:
   a display layer displaying an image;
   a light guide plate disposed under the display layer and guiding a light of a back light source to the display layer;
   a light diffusion layer disposed between the display layer and the light guide plate, wherein the light diffusion layer is controlled by at least a control voltage to dynamically change a transparency of the light diffusion layer, and
   a light reflection layer disposed under the light guide plate such that the light guide plate is located between the display layer and the light reflection layer, wherein the light reflection layer is controlled by at least a second control voltage to dynamically change a transparency of the light reflection layer, and a thickness of the light reflection layer is greater than a thickness of the light diffusion layer.

2. The display panel according to claim 1, wherein the light diffusion layer presents a transparent state when the control voltage exceeds a threshold voltage, and the light diffusion layer presents a non-transparent state when the control voltage is lower than the threshold voltage.

3. The display panel according to claim 1, wherein a material of the light guide plate is a transparent material, and a material of the light diffusion layer comprises a polymer dispersed liquid crystal.

4. The display panel according to claim 1, wherein the light reflection layer presents a transparent state when the second control voltage exceeds a threshold voltage, and the light reflection layer presents a non-transparent state when the second control voltage is lower than the threshold voltage.

5. The display panel according to claim 1, wherein the thickness of the light diffusion layer is 75 μm to 200 μm, and the thickness of the light reflection layer is 201 μm to 1000 μm.

6. The display panel according to claim 1, further comprising:
   a one-way mirror layer disposed under the light reflection layer such that the light reflection layer is located between the display layer and the one-way mirror layer, wherein the one-way mirror layer allows an external light to reach the light reflection layer through the one-way mirror layer, and the one-way mirror layer reflects a light from the light reflection layer.

7. The display panel according to claim 1, wherein a material of the light reflection layer comprises a polymer dispersed liquid crystal.

8. The display panel according to claim 1, wherein the light diffusion layer has a first region and a second region, the light reflection layer has a first region and a second region, the first region of the light diffusion layer and the first region of the light reflection layer are disposed opposite to each other, the second region of the light diffusion layer and the second region of the light reflection layer are disposed opposite to each other, a change of a transparency of the first region of the light reflection layer is independent of a change of a transparency of the second region of the light reflection layer, and a change of a transparency of the first region of the light diffusion layer is independent of a change of a transparency of the second region of the light diffusion layer.

9. The display panel according to claim 1, further comprising:
   a one-way mirror layer disposed under the light guide plate such that the light guide plate is located between the display layer and the one-way mirror layer, wherein the one-way mirror layer allows an external light to reach the light guide plate through the one-way mirror layer, and the one-way mirror layer reflects the light from the light guide plate.

10. The display panel according to claim 9, the light reflection layer is disposed under the one-way mirror layer such that the one-way mirror layer is located between the light guide plate and the light reflection layer.

11. The display panel according to claim 1, wherein the light guide plate comprises a plurality of light guide microstructures, and a geometric shape of any of the light guide microstructures is the same as a geometric shape of a pixel or a sub-pixel of the display layer.

12. The display panel according to claim 11, wherein the geometric shape of any of the light guide microstructures is rectangular.

13. The display panel according to claim 11, wherein a position of any of the light guide microstructures corresponds to a position of the pixel or the sub-pixel of the display layer.

14. The display panel according to claim 11, wherein a width of any of the light guide microstructures is an integer multiple of a width of the pixel or the sub-pixel, and a length of any of the light guide microstructures is an integer multiple of a length of the pixel or the sub-pixel.

* * * * *